(12) United States Patent
Dosovitsky et al.

(10) Patent No.: US 10,972,344 B2
(45) Date of Patent: *Apr. 6, 2021

(54) AUTOMATED ADJUSTMENT OF SUBSCRIBER POLICIES

(71) Applicant: A10 Networks, Inc., San Jose, CA (US)

(72) Inventors: Gennady Dosovitsky, Sunnyvale, CA (US); Kishore Inampudi, Cupertino, CA (US)

(73) Assignee: A10 Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/267,823

(22) Filed: Feb. 5, 2019

(65) Prior Publication Data

US 2019/0173752 A1 Jun. 6, 2019

Related U.S. Application Data

(63) Continuation of application No. 14/825,883, filed on Aug. 13, 2015, now Pat. No. 10,243,791.

(51) Int. Cl.
*G06F 15/173* (2006.01)
*H04L 12/24* (2006.01)
*H04L 12/26* (2006.01)

(52) U.S. Cl.
CPC ...... *H04L 41/0816* (2013.01); *H04L 41/5025* (2013.01); *H04L 43/08* (2013.01); *H04L 43/16* (2013.01)

(58) Field of Classification Search
CPC . H04L 41/0816; H04L 41/5025; H04L 43/08; H04L 43/16; H04L 12/24; H04L 12/26; G06F 15/173
See application file for complete search history.

(56) References Cited

U.S. PATENT DOCUMENTS

| | | | |
|---|---|---|---|
| 7,818,252 B2 * | 10/2010 | Jackowski | G06Q 20/102 705/35 |
| 8,787,174 B2 * | 7/2014 | Riley | H04L 12/14 370/237 |
| 8,996,670 B2 | 3/2015 | Kupinsky et al. | |
| 2005/0256947 A1 * | 11/2005 | Devarakonda | H04L 41/0893 709/223 |
| 2006/0233101 A1 | 10/2006 | Luft et al. | |
| 2012/0213072 A1 | 8/2012 | Kotecha et al. | |
| 2012/0218892 A1 | 8/2012 | Kotecha et al. | |
| 2013/0176908 A1 | 7/2013 | Baniel et al. | |

(Continued)

*Primary Examiner* — Cheikh T Ndiaye
(74) *Attorney, Agent, or Firm* — Keith Kline; The Kline Law Firm PC

(57) ABSTRACT

Provided are methods and systems for adjusting subscriber policies. A method for adjusting of subscriber policies may include applying traffic enforcement rules to a data traffic associated with a subscriber. The method can further include determining network conditions associated with the data traffic. The method can include modifying, based on the determination of the network conditions, attributes according to attribute adjustment rules to obtain modified attributes. The method can further include modifying the traffic enforcement rules based on the modified attributes to obtain modified traffic enforcement rules.

20 Claims, 13 Drawing Sheets

(56) References Cited

U.S. PATENT DOCUMENTS

| | | | |
|---|---|---|---|
| 2014/0086052 A1* | 3/2014 | Cai | H04M 15/8027 370/235 |
| 2014/0130119 A1* | 5/2014 | Goldschlag | H04L 63/20 726/1 |
| 2014/0219082 A1* | 8/2014 | Geijer Lundin | H04L 47/12 370/229 |
| 2014/0254367 A1 | 9/2014 | Jeong et al. | |
| 2016/0262057 A1* | 9/2016 | Speicher | H04W 28/0268 |

* cited by examiner

AUTOMATED ADJUSTMENT OF SUBSCRIBER POLICIES

CROSS-REFERENCE TO RELATED APPLICATIONS

The present application is a continuation of, and claims the priority benefit of, U.S. patent application Ser. No. 14/825,883 filed on Aug. 13, 2015, entitled "AUTOMATED ADJUSTMENT OF SUBSCRIBER POLICIES," the disclosure of which is incorporated herein by reference in its entirety for all purposes.

TECHNICAL FIELD

This disclosure relates generally to data processing and, more specifically, to automated adjusting of subscriber policies for a data traffic flow.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Certain network parameters may be monitored for predefined events and conditions. Such monitoring may involve a human operator. Upon detecting the predefined network events and conditions (for example, a threshold throughput of the network), the network operator may decide that certain changes or adjustments need to be applied to network policies to mitigate the predefined network events and conditions.

Monitoring the network can be a complex task with a great number of parameters that require monitoring, such as, for example, global factors (time of the day, show and sport events, planned and unplanned reconfiguration), a network status (resource availability and resource utilization), subscriber group behavior, subscriber individual behavior, dynamics of subscriber behavior, and so forth. Moreover, the more complex (in view of the number of parameters to be monitored) the network is, the faster the network operator needs to react to avoid network congestions and bad user experiences and to react to rapidly changing user or group behavior.

Additionally, manual intervention by the network operator into the network operational process may be a limiting factor in view of a low-speed reaction of the network operator and in view of a human factor in a semi-automated procedure of monitoring. Furthermore, policies that outline rules for the network operational process may be complex and granular, and mitigation of the network events or conditions may require only small changes in the policies to have a significant impact on network behavior. It can be very challenging for the network operator to monitor the network and to apply changes of any magnitude to granular policies.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for adjusting subscriber policies. Specifically, a method for adjusting subscriber policies may include applying traffic enforcement rules to a data traffic associated with a subscriber. The method can further include determining network conditions associated with the data traffic. The method can include modifying, based on the determination of the network conditions, attributes according to attribute adjustment rules to obtain modified attributes. The method can further include modifying the traffic enforcement rules based on the modified attributes to obtain modified traffic enforcement rules.

According to another approach of the present disclosure, there is provided a system for automated adjusting of subscriber policies. The system may comprise a servicing node and a policy management unit. The servicing node can be operable to apply traffic enforcement rules to a data traffic associated with a subscriber. Furthermore, the servicing node can be operable to determine network conditions associated with the data traffic. The servicing node can be operable to modify the traffic enforcement rules based on modified attributes to obtain modified traffic enforcement rules. The policy management unit can be operable to modify attributes based on attribute adjustment rules to obtain the modified attributes. The modifying of the attributes may be performed based on the determination of the network conditions.

According to another approach of the present disclosure, there is provided a system for automated adjustment of subscriber policies. The system may comprise a servicing node that can be operable to apply traffic enforcement rules to a data traffic associated with a subscriber. The servicing node can be further operable to determine network conditions associated with the data traffic. Based on the determination, the servicing node can be operable to modify attributes according to attribute adjustment rules to obtain modified attributes. The servicing node can be further operable to modify the traffic enforcement rules based on the modified attributes to obtain modified traffic enforcement rules.

In further example embodiments of the present disclosure, the method steps are stored on a machine-readable medium comprising instructions which, when implemented by one or more processors, perform the recited steps. In yet further example embodiments, hardware systems or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
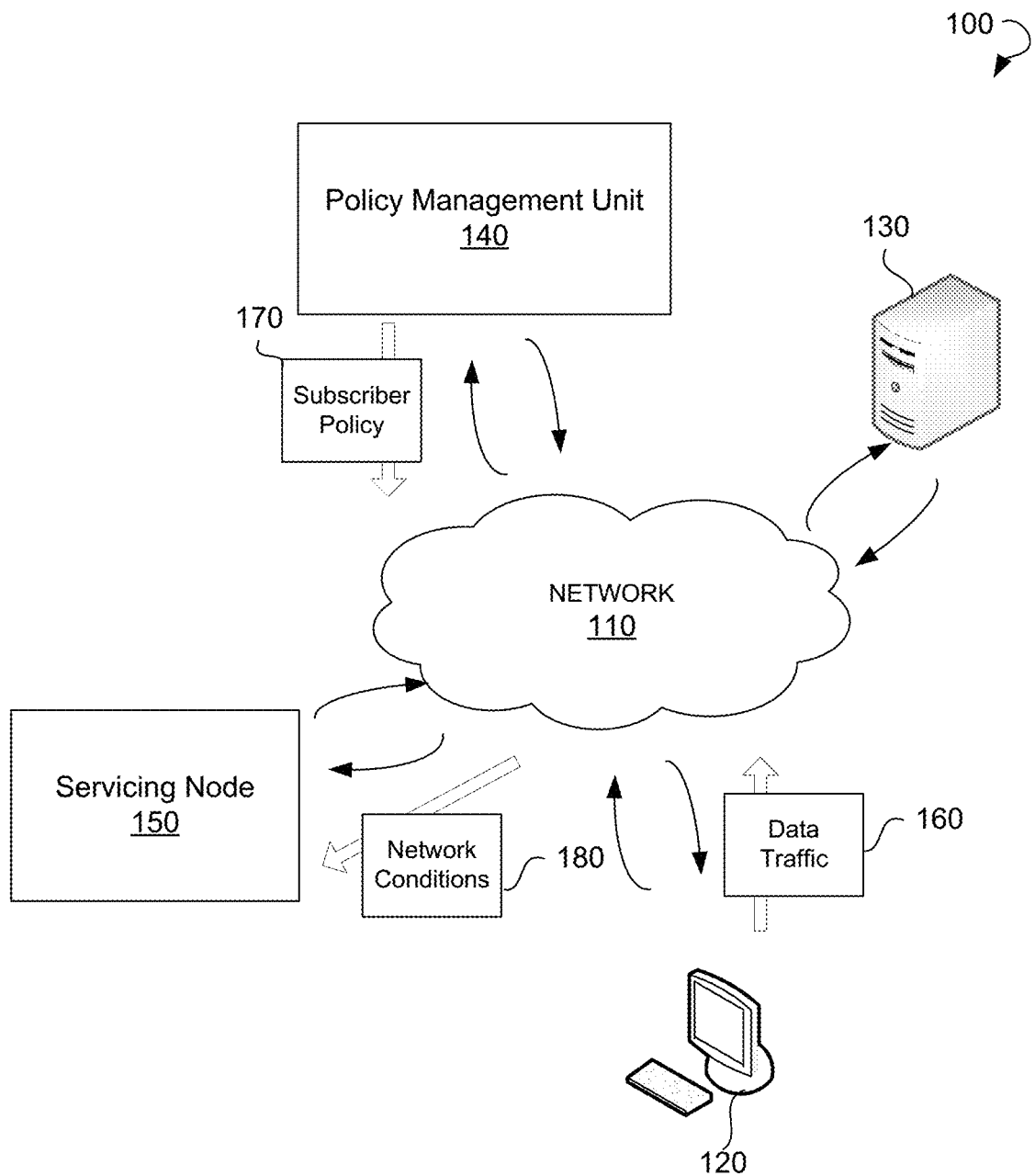
FIG. 1 shows an environment within which methods and systems for an automated adjustment of subscriber policies can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, a tablet computer, a laptop computer, and a server), a game console, a handheld gaming device, a cellular phone, a smart phone, a smart television system, and so forth.

The present disclosure relates to methods and systems for automated adjustment of subscriber policies of a network operational process. An example system of the present disclosure may include a policy management unit that may develop and maintain traffic enforcement rules, also referred herein to as policies. The traffic enforcement rules may include rules for processing of data traffic during operation of the network. Network conditions may change and the system may need to react to the changed network conditions to provide an efficient operation of the network. The network conditions may be determined based on attributes (also referred to herein as parameters) of the network, such as a network status, network throughput, resource unitization, bandwidth consumed by active users, and so forth.

The policy management unit may create attribute adjustment rules. The attribute adjustment rules may include rules that are to be applied in response to detection of predetermined attributes (for example, the attributes that are outside threshold values). Making decisions related to a policy modification and, more specifically, a modification of the traffic enforcement rules, may be delegated to a servicing node. Thus, the servicing node, also referred to herein as an enforcing element, can obtain traffic enforcement rules and attribute adjustment rules from a policy management unit. The servicing node may further apply the traffic enforcement rules to the data traffic. Upon applying the traffic enforcement rules, the servicing node can monitor network conditions. Based on the monitoring, the servicing mode may determine that certain attributes of the network need to be modified. For example, a predefined bandwidth limit may be not sufficient to ensure access to a server for active users and, therefore, the predefined bandwidth limit may need to be adjusted. Thus, the servicing node may apply the attribute adjustment rules to the attributes and obtain modified attributes. For example, the bandwidth limit may be increased to allow access to the server for active users. The modified attributes may allow for a normal operation of the network.

Furthermore, the servicing node may modify the traffic enforcement rules based on the modified attributes. Therefore, after modification of the attributes, the modified traffic enforcement rules may be applied to the data traffic of the network. Additionally, the servicing node may notify the policy management unit about modification of the traffic enforcement rules.

Referring now to the drawings, FIG. 1 illustrates an environment 100 within which methods and systems for automated adjustment of subscriber policies can be implemented. The environment 100 may include a network 110, a subscriber 120, a server 130, a policy management unit 140, and a servicing node 150. The subscriber 120 may include a network machine, a network resource, or a user that sends requests shown as data traffic 160 to the server 130. The server 130 may be associated with a plurality of services, applications, and websites accessible over the network 110. The subscriber 120 and the server 130 may communicate with each other using the network 110.

The network 110 may include the Internet or any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The network 110 may include a network of data processing nodes that are interconnected for the purpose of data communication.

The policy management unit 140 may be responsible for creating and maintaining a subscriber policy 170. The servicing node 150 may be operable to process the data traffic 160 according to the subscriber policy 170. Furthermore, the servicing node 150 may monitor network conditions 180 established in the network upon applying of the subscriber policy 170. Based on the network conditions 180, the servicing node 150 may decide if the subscriber policy 170 needs to be modified. The servicing node 150 may modify the subscriber policy 170 and send a notification concerning modifications to the policy management unit 140.

Figure 2:
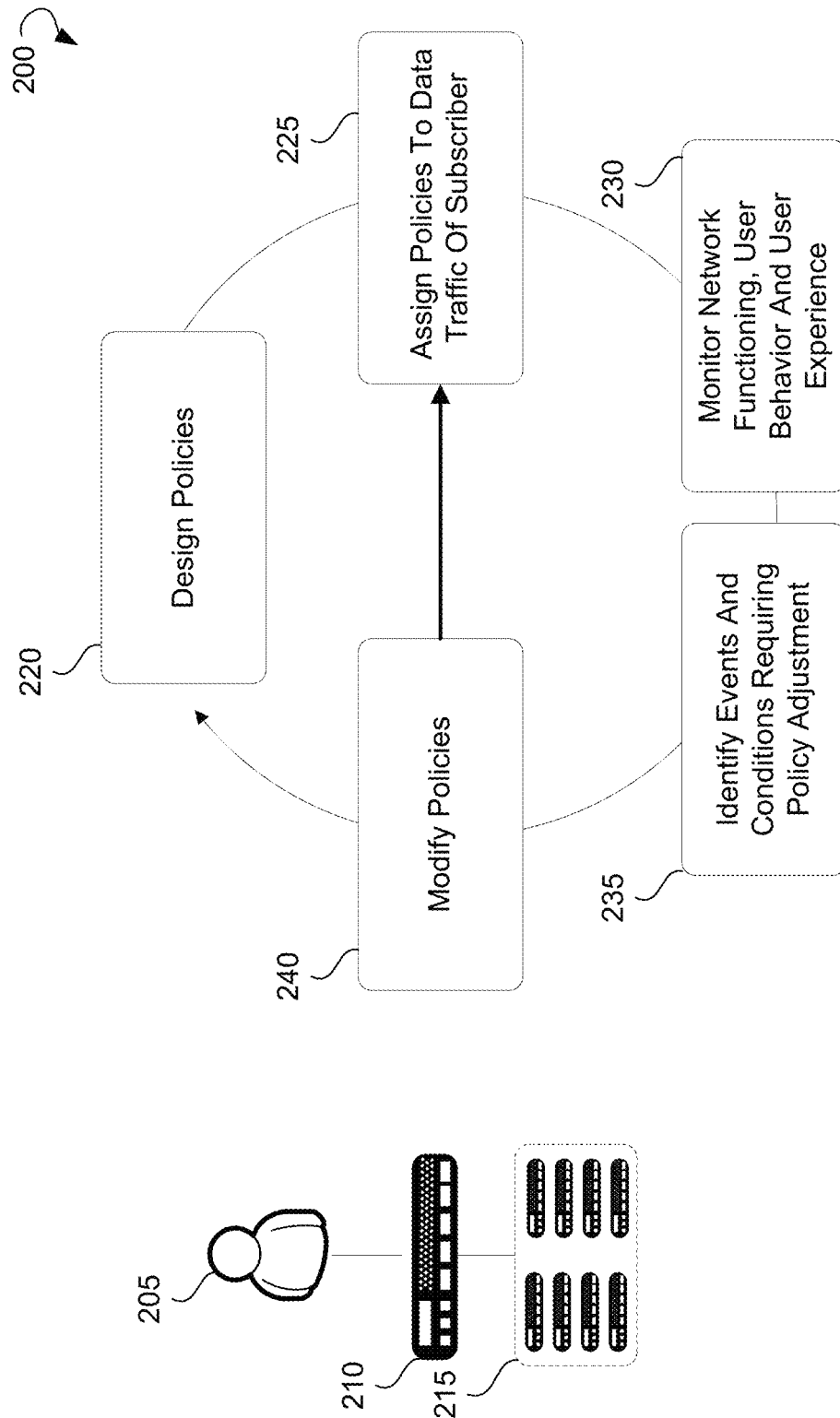
FIG. 2 is a diagram showing an operational process of reacting to changes in network conditions.

FIG. 2 is a diagram 200 showing a conventional operational process of reacting to changes in network conditions. More specifically, a network operator 205 can have access to a policy server 210 that may communicate with a plurality of policy engines 215. The operations performed by the network operator 205 may include designing policies at step 220. In an example embodiment, the policies may be selected by the network operator 205 from predetermined policies stored or developed by the policy engines 215. At step 225, the policies may be assigned to data traffic received from a subscriber so that the data traffic may be processed according to the assigned policies. Upon assigning the policies, the network operator 205 may monitor network functioning, a user behavior, a user experience, and other network conditions at step 230. During the monitoring, the network operator 205 may identify network conditions and events that require policy adjustment at step 235. More specifically, as the network conditions change, the policies applied to the data traffic may be inefficient for providing needed network performance. Therefore, such policies may require adjustment. At step 240, the network operator 205 may modify the policies with regard to the data traffic of the subscriber.

Figure 3:
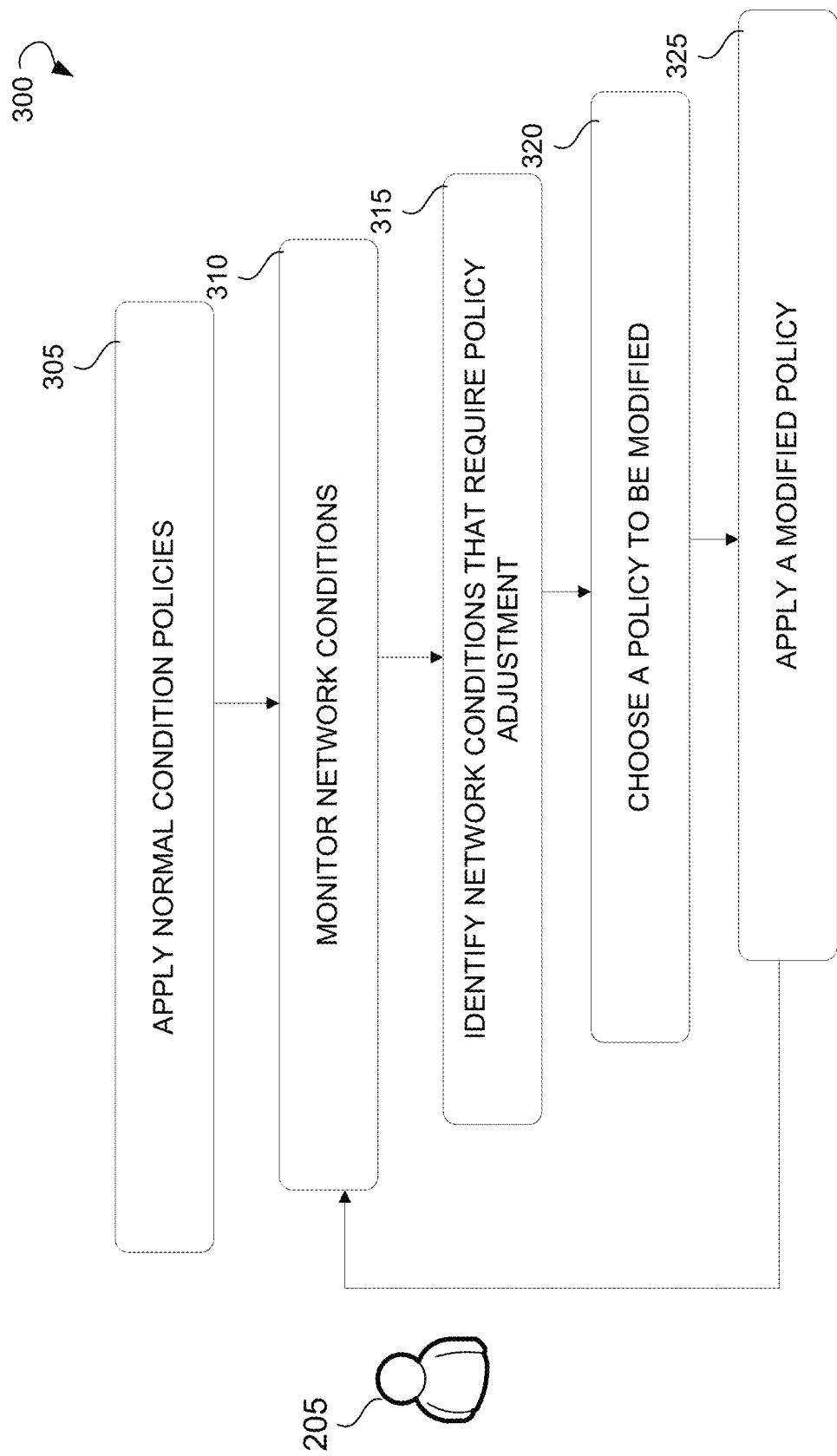
FIG. 3 is a flow chart diagram of a process for a policy adjustment for data traffic flow.

The conventional operational process of FIG. 2 is further explained in FIG. 3, which shows a flow chart diagram 300 of conventional adjustment of policies for data traffic flow. More specifically, the network operator 205 may apply normal condition policies to data traffic received from a subscriber or a group of subscribers at operation 305. The normal condition policies may be taken from policy engines. Upon applying the normal condition policies, the network operator 205 may monitor network conditions at operation 310. At operation 315, the network operator 205 may identify that certain network conditions may go beyond predetermined thresholds. For example, a network throughput may exceed a predetermined value (e.g., 70%). Based on such identifying, the operator may take a decision that policies need to be modified to maintain the identified network conditions and not exceed the predetermined thresholds. At operation 320, the network operator 205 may choose a policy to be modified. The network operator may further apply the modified policy to the data traffic at operation 325. After operation 325, the process may return to operation 310 so that the network operator 205 can continue monitoring the network conditions.

However, in view of a plurality of network conditions that require monitoring, the network operator 205 may be overloaded with the tasks of modifying the policies and, therefore, may be unable to react timely to the changing network conditions. Therefore, the network performance may be insufficient to provide the subscriber with access to network services and applications to which the subscriber sends the data traffic.

Figure 4:
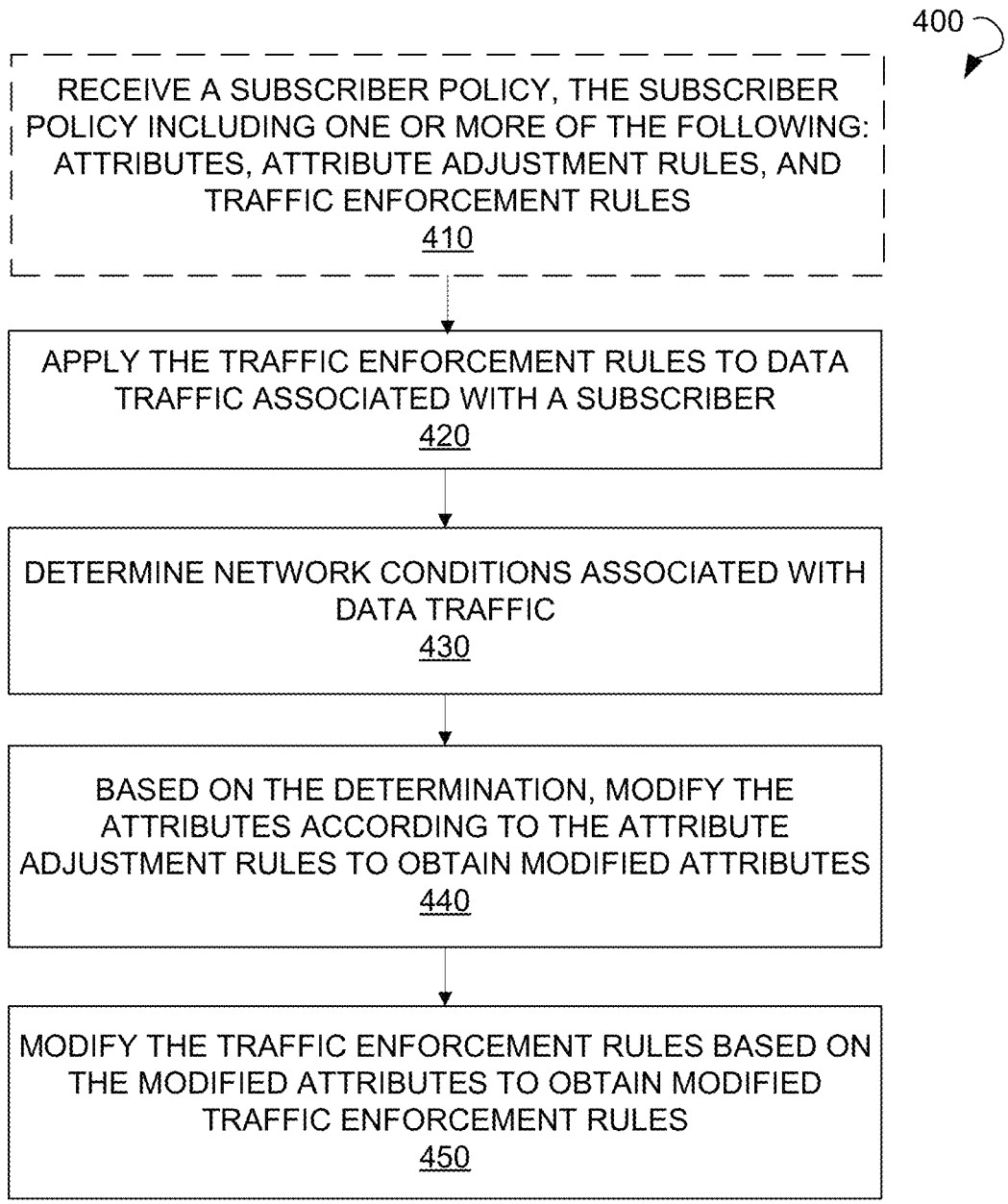
FIG. 4 shows a process flow diagram of a method for an automated adjustment of subscriber policies.

FIG. 4 shows a process flow diagram of a method 400 for automated adjusting of subscriber policies, according to an example embodiment. In some embodiments, the operations may be combined, performed in parallel, or performed in a different order. The method 400 may also include additional or fewer operations than those illustrated. The method 400 may be performed by processing logic that may comprise hardware (e.g., decision making logic, dedicated logic, programmable logic, and microcode), software (such as software run on a general-purpose computer system or a dedicated machine), or a combination of both.

The method 400 may commence with optional operation 410 of receiving a subscriber policy. In an example embodiment, the subscriber policy includes one or more of the following: attributes, attribute adjustment rules, and traffic enforcement rules. The method 400 may further include applying the traffic enforcement rules to a data traffic associated with a subscriber at operation 420.

The method 400 may continue with operation 430, at which network conditions associated with the data traffic may be determined. In an example embodiment, the network conditions may include one or more of the following: events associated with the network, a network workload, a resource availability, a resource utilization, a subscriber behavior, a user experience, a time, a planned reconfiguration, an unplanned reconfiguration, and so forth.

In some embodiments, the method 400 may optionally include continuous monitoring of the network conditions within the network. The monitoring conditions may be analyzed. Based on the analysis, an occurrence of a critical event may be determined. In an example embodiment, the critical event may include one or more of the following: an absence of one of a predetermined network condition, presence of an additional network condition being absent from the predetermined network conditions, exceeding a predetermined threshold of the one of the predetermined network conditions, and so forth. In response to the occurrence of the critical event, the attributes may be modified.

More specifically, upon determination of the network conditions, the modifying of the attributes may be performed based on attribute adjustment rules at operation 440. Based on the modification, modified attributes may be obtained.

The method 400 may continue with modifying the traffic enforcement rules at operation 450. The traffic enforcement rules may be modified based on the modified attributes. Therefore, modified traffic enforcement rules may be obtained based on the modification of the traffic enforcement rules. The modified traffic enforcement rules may be applied to a further data traffic associated with the subscriber.

Figure 5:
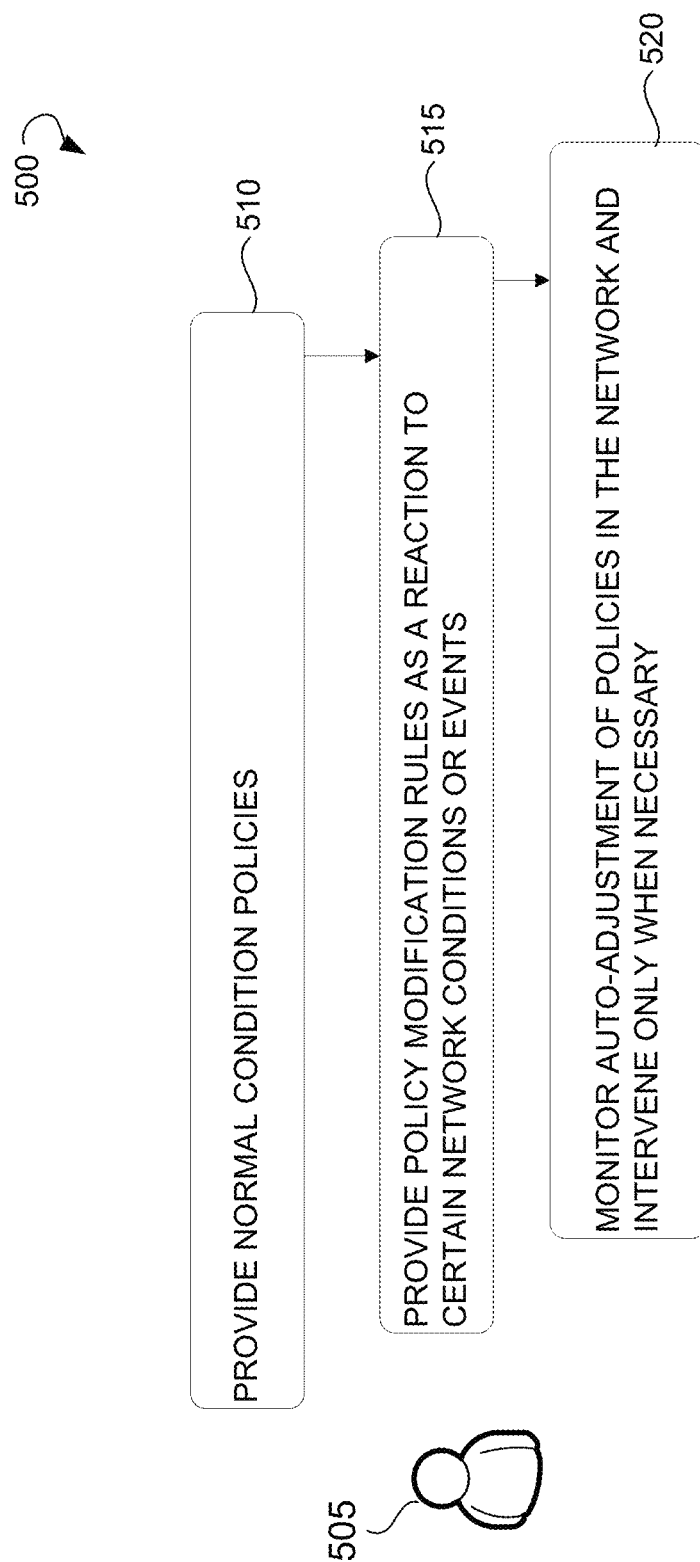
FIG. 5 is a flow chart diagram illustrating a process for policy adjustment by a network operator.

FIG. 5 is a flow chart diagram 500 illustrating a process performed by a network operator for automated adjusting of subscriber policies, according to an example embodiment. More specifically, a network operator 505 may provide normal condition policies at step 510. At step 515, the network operator 505 may provide policy modification rules, which may serve as rules for reacting to certain network conditions or events. At step 520, the network operator 505 may monitor automatic adjustment of policies based on the policy modification rules. The network operator 505 may intervene into the operational process only when necessary, such as for solving complex tasks, performing periodical checking of the network performance, or for other purposes. Therefore, the network operator 505 is not excluded from management of the network operational process, but a real-time reaction of the operator in response to a change of network conditions is not needed.

Figure 6:
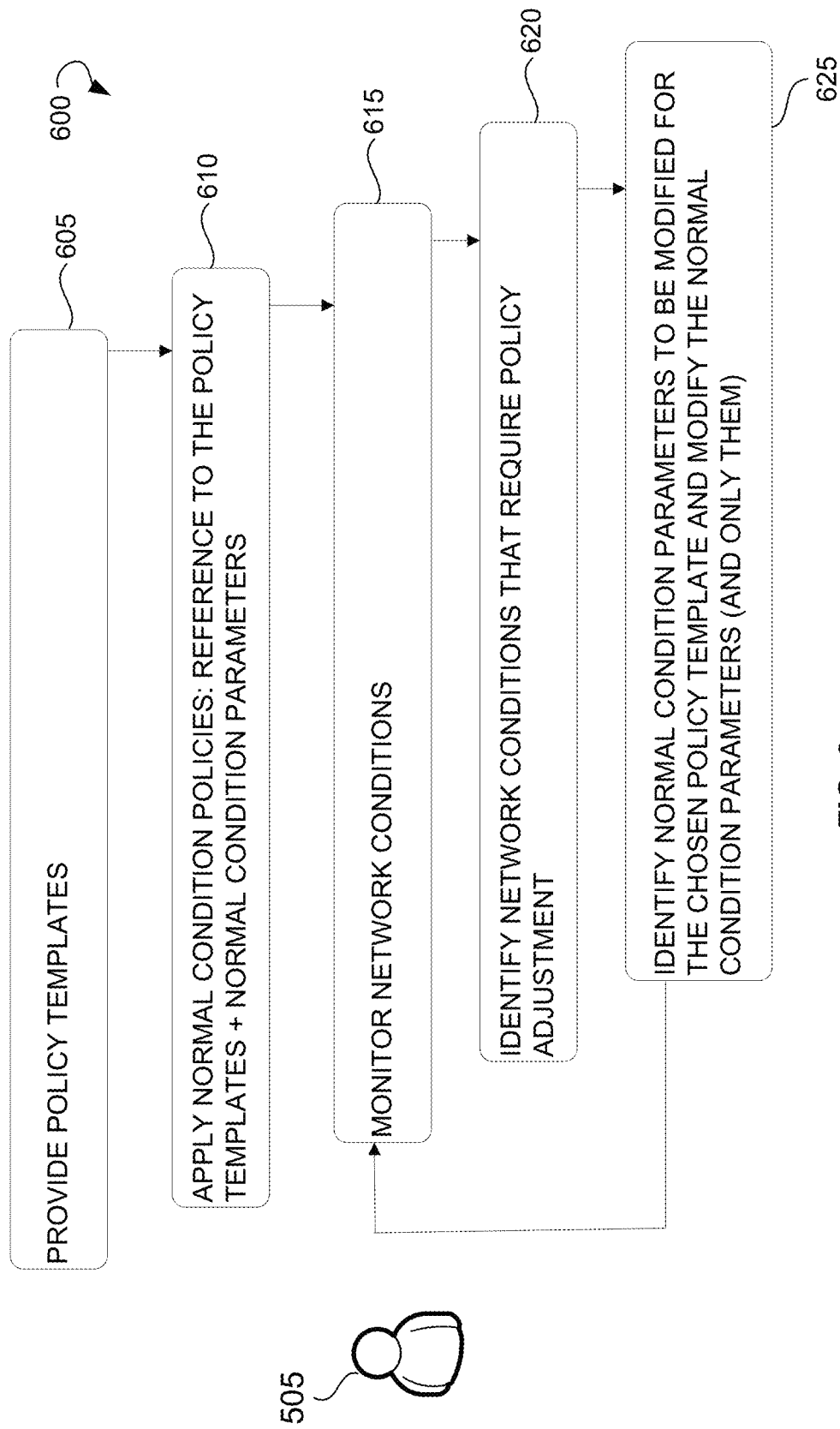
FIG. 6 is a flow chart diagram illustrating a process for adjustment of policies for data traffic flow using template-based policies.

FIG. 6 is a flow chart diagram 600 illustrating a process for adjustment of policies for data traffic flow using template-based policies, according to an example embodiment. More specifically, the network operator 505 may provide policy templates (i.e., templates of policies for a static configuration of the network) at step 605. At step 610, the network operator 505 may apply normal condition policies by using the policy templates and normal condition parameters of the network. At step 615, the network operator 505 may monitor network conditions.

At step 620, the network operator 505 may identify that certain network conditions may go beyond predetermined thresholds. For example, a network throughput may exceed a predetermined value (e.g., 70%). Based on such identifying, the network operator 505 may take a decision that policies need to be modified to maintain the identified network conditions so as to not exceed the predetermined thresholds. Based on such decision, the network operator 505 may identify normal condition parameters that need to be modified for the chosen policy template at step 625. Thereafter, the identified normal condition parameters may be modified. After step 625, the process may return to step 615 so that the network operator 505 can continue monitoring the network conditions.

Figure 7:
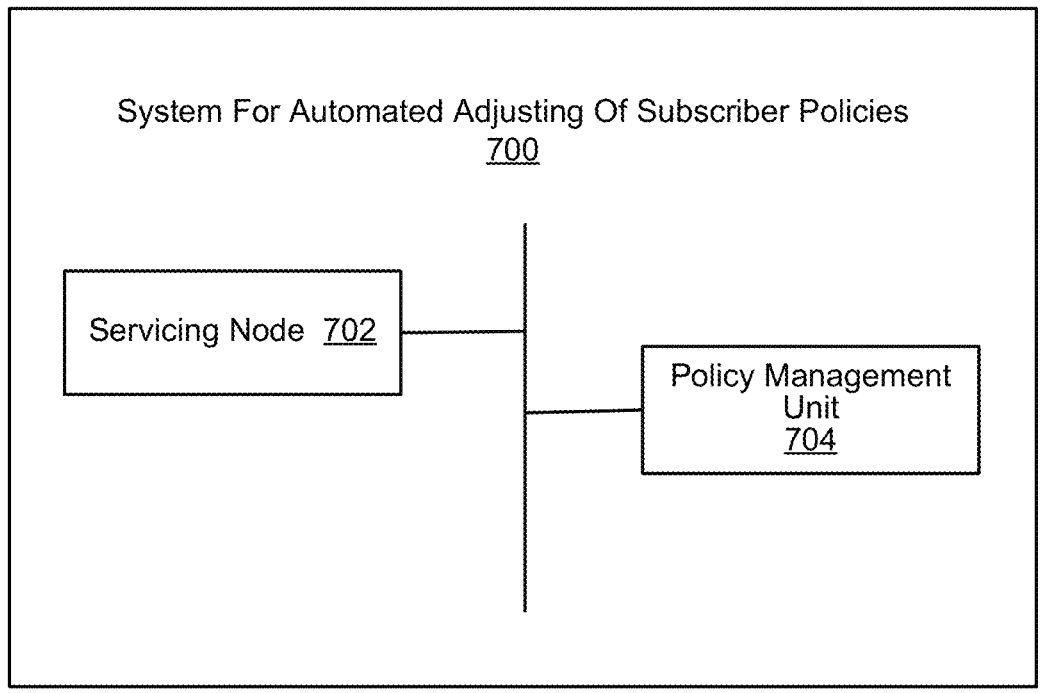
FIG. 7 shows a block diagram illustrating various modules of a system for automated adjustment of subscriber policies.

FIG. 7 shows a block diagram illustrating various modules of an example system 700 for automated adjusting of subscriber policies. Specifically, the system 700 may include a servicing node 702 and a policy management unit 704. Interactions between the servicing node 702 and the policy management unit 704 of the system 700 are explained in detail with reference to FIG. 8 and FIG. 9.

Figure 8:
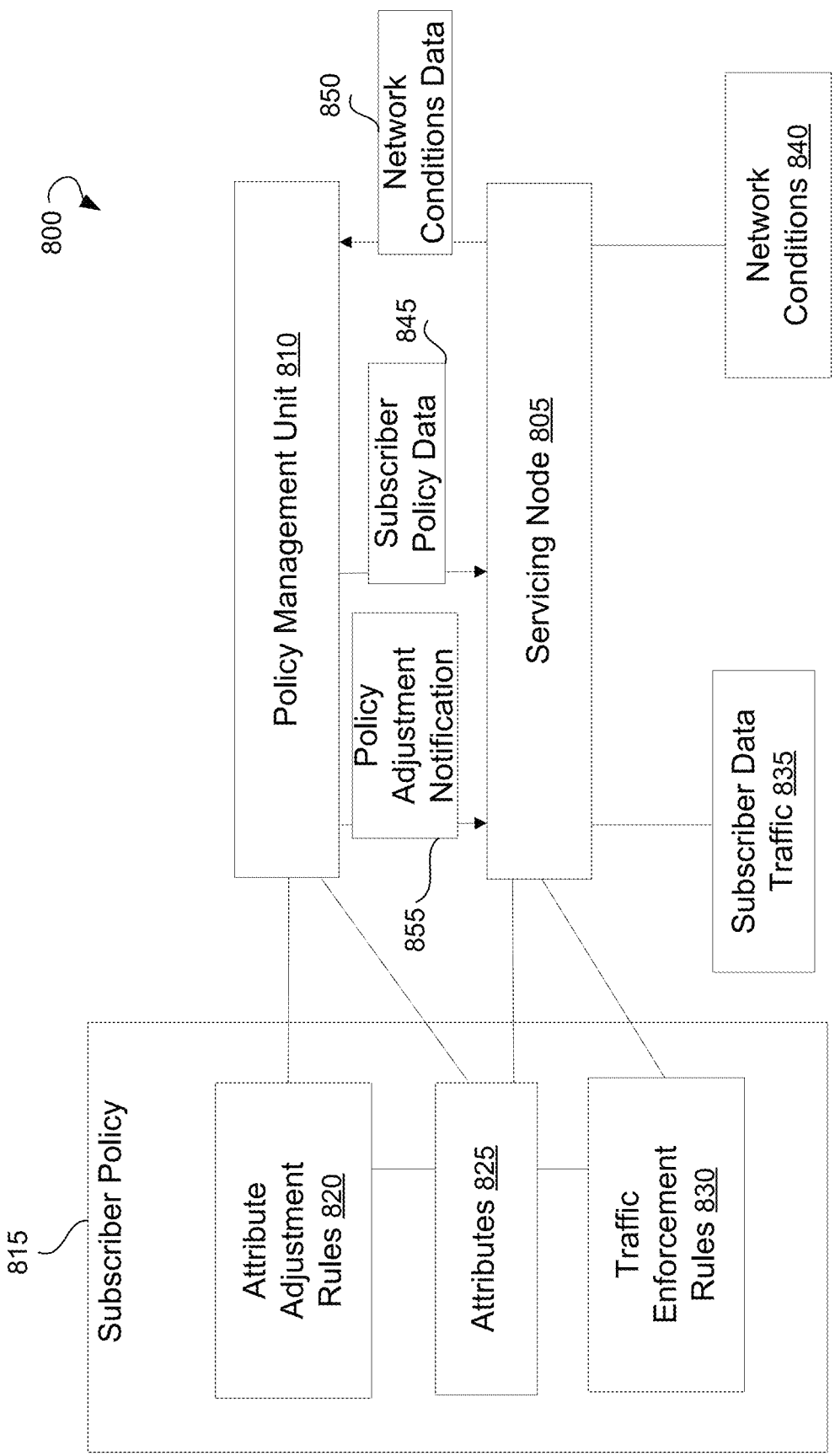
FIG. 8 is a block diagram showing a servicing node and a policy management unit handling automated adjustment of subscriber policies.

FIG. 8 is a is a block diagram 800 showing a servicing node 805 and a policy management unit 810 handling automated adjusting of subscriber policies, according to an example embodiment of the system 700 for automated adjusting of subscriber policies. The policy management unit 810 may be operable to maintain a subscriber policy 815. The subscriber policy 815 may include attribute adjustment rules 820, attributes 825, and traffic enforcement rules 830. The policy management unit 810 may be operable to send subscriber policy data 845 (i.e., data describing the subscriber policy 815) to the servicing node 805. The subscriber policy data 845 may include at least the attributes 825 and the traffic enforcement rules 830.

The servicing node 805 may be operable to apply the traffic enforcement rules 830 to a data traffic 835 associated with a subscriber. The servicing node 805 may be further operable to determine network conditions 840 associated with the data traffic 835. The servicing node 805 may send data 850 associated with the network conditions 840 to the policy management unit 810. In an example embodiment, the network conditions 840 may include one or more of the following: events associated with the network, a network workload, a resource availability, a resource utilization, a subscriber behavior, a user experience, a time, a planned reconfiguration, an unplanned reconfiguration, and so forth.

In an example embodiment, the policy management unit 810 may analyze the network conditions 840. Based on the analysis, the policy management unit 810 may determine an occurrence of a critical event. The critical event may include one or more of the following: an absence of one of predetermined network conditions, presence of an additional network condition being absent from the predetermined network conditions, exceeding a predetermined threshold in the one of the predetermined network conditions, and so forth.

Based on the network conditions 840, such as the occurrence of the critical event, the policy management unit 810 may modify the attributes 825 by applying the attribute adjustment rules 820. Therefore, modified attributes (not shown) may be obtained. The policy management unit 810 may send a policy adjustment notification 855 to the servicing node 805. The policy adjustment notification 855 may contain the modified attributes.

Based on receiving of the policy adjustment notification 855, the servicing node 805 may modify the traffic enforcement rules 830 based on the modified attributes. Therefore, modified traffic enforcement rules (not shown) may be obtained.

Figure 9:
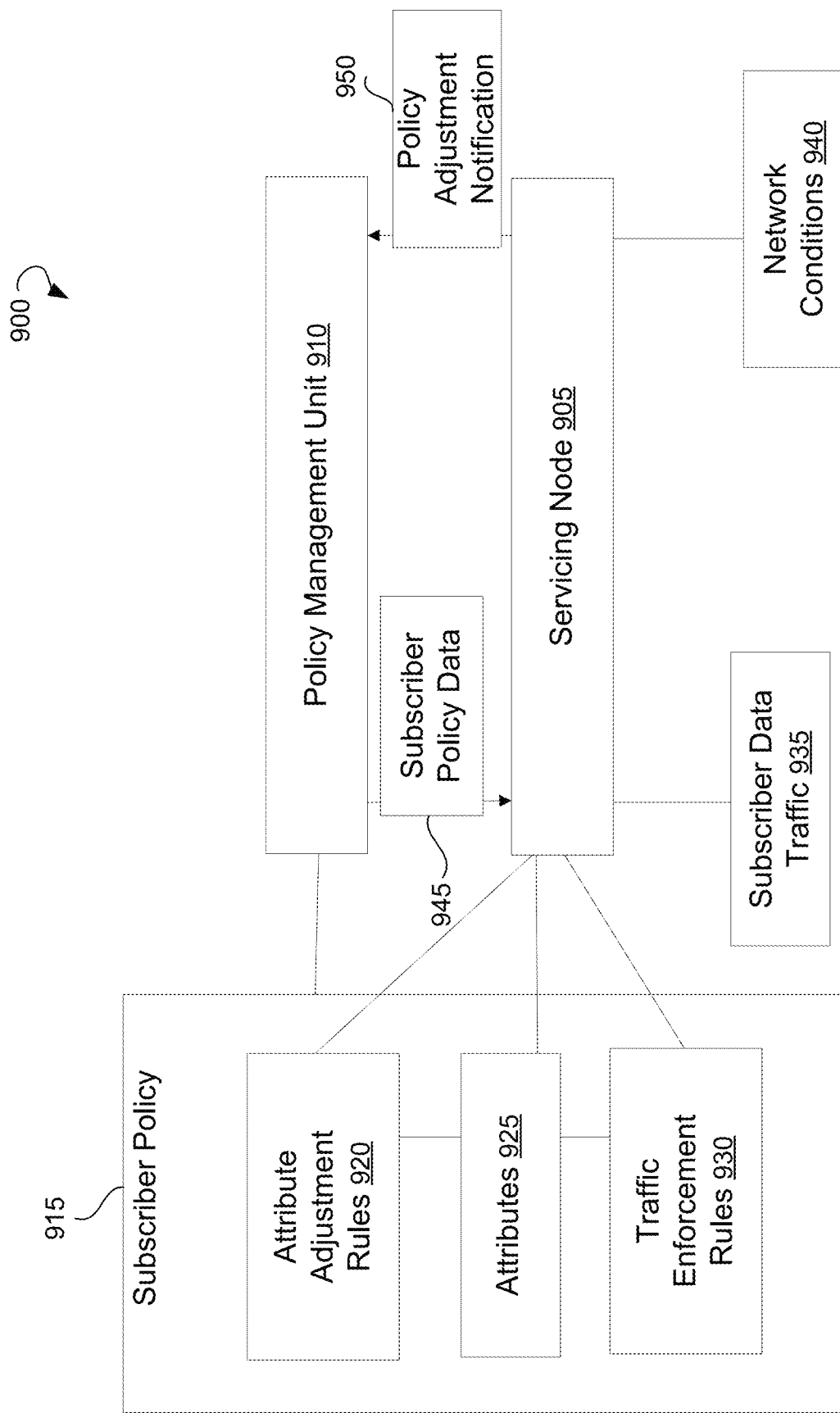
FIG. 9 is a block diagram showing a servicing node and a policy management unit handling automated adjustment of subscriber policies.

FIG. 9 is a is a block diagram 900 showing a servicing node 905 and a policy management unit 910 handling automated adjusting of subscriber policies, according to another example embodiment of the system 700 for automated adjusting of subscriber policies. The policy management unit 910 may be operable to maintain a subscriber policy 915. The subscriber policy 915 may include attribute adjustment rules 920, attributes 925, and traffic enforcement rules 930. The policy management unit 910 may be operable to send subscriber policy data 945 (i.e., data describing the subscriber policy 915) to the servicing node 905. The subscriber policy data 945 may include the attribute adjustment rules 920, the attributes 925, and the traffic enforcement rules 930.

The servicing node 905 may be operable to apply the traffic enforcement rules 930 to a data traffic 935 associated with a subscriber. The servicing node 905 may be further operable to determine network conditions 940 associated with the data traffic 935. In an example embodiment, the network conditions 840 may include one or more of the following: events associated with the network, a network workload, a resource availability, a resource utilization, a subscriber behavior, a user experience, a time, a planned reconfiguration, an unplanned reconfiguration, and so forth.

In an example embodiment, the servicing node 905 may analyze the network conditions 940. Based on the analysis, the servicing node 905 may determine an occurrence of a critical event. The critical event may include one or more of the following: an absence of one of predetermined network conditions, presence of an additional network condition being absent from the predetermined network conditions, exceeding a predetermined threshold in the one of the predetermined network conditions, and so forth.

Based on the network conditions 940, such as the occurrence of the critical event, the servicing node 905 may modify the attributes 925 by applying the attribute adjustment rules 920. Therefore, modified attributes (not shown) may be obtained. Based on the modified attributes, the servicing node 805 may modify the traffic enforcement rules 930. Therefore, modified traffic enforcement rules (not shown) may be obtained.

Additionally, the servicing node 905 may send a policy adjustment notification 950 to the policy management unit

910. The policy adjustment notification 950 may contain the modified traffic enforcement rules.

Thus, the system for automated adjusting of subscriber policies delegates making decisions for policy modification to a servicing node. The servicing node may modify the policies (i.e., the traffic enforcement rules) based on evaluation of monitored events and conditions. Therefore, a network operator does not need to intervene into the network operational process. The servicing node may ensure immediate reaction when policy modification is needed. Therefore, the complexity of policy modification execution can be shifted to the servicing node. The policy management unit may be responsible for defining in advance how to modify the policy if/when modification is needed. Thus, the policy management unit may still be the master of the network operational process and responsible for provisioning rules regarding how the policy can be changed.

Additionally, a policy provisioning transaction (in particular, data traffic associated with sending of the policy or the modified policy) may be smaller by volume, because only some attributes (rather than the whole policy) are modified. Therefore, more transactions per second may be allowed. Furthermore, time needed for massive updates of policies may be reduced. Furthermore, the servicing node may be provided with a template for modifying the policy. The template may include a list of modifiable attributes (i.e., the attributes of the network that can be modified). A list of attributes modified by the servicing node may match the list of modifiable attributes in the template to reduce the probability of operational mistakes during modification of the policy.

Additionally, a partial list of attributes may be provided to the servicing node. The partial list may include only the attributes that have been changed since the previous providing of the policy to the servicing node. Furthermore, there may be no need to provide the template to the servicing node if the template was not changed.

Figure 10:
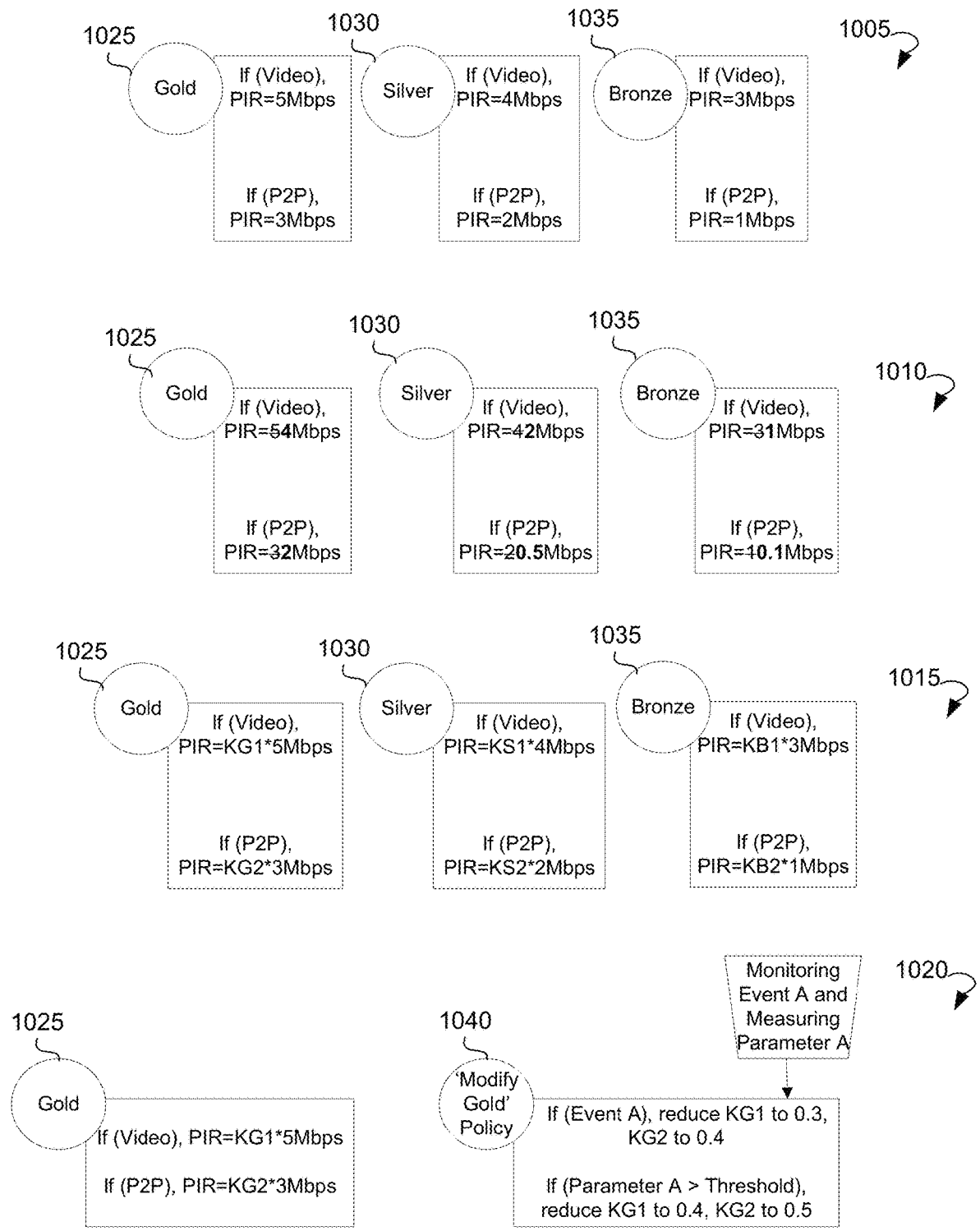
FIG. 10 shows schematic diagrams illustrating examples of policy modifications depending on a level of a service provided to a subscriber.

FIG. 10 shows schematic diagrams 1005, 1010, 1015, and 1020 illustrating examples of modification of policies depending on a level of service provided to a subscriber. The schematic diagrams 1005, 1010, 1015 show three levels 1025, 1030, and 1035 of services, shown as "Gold," "Silver," and "Bronze," respectively.

The schematic diagram 1005 illustrates conventional applying of policies to subscribers. For each of the levels 1025, 1030, and 1035 of services, the policy may be applied based on a type of service. For example, for the level 1025 of services, the policy may prescribe a peak information rate (PIR) of 5 megabits per second if the type of service is a video service, and a PIR of 3 megabits per second if the type of service is a peer-to-peer service. Similarly, for the level 1030 of services, the policy may prescribe a PIR of 4 megabits per second if the type of service is a video service, and a PIR of 2 megabits per second if the type of service is a peer-to-peer service. For the level 1035 of services, the policy may prescribe a PIR of 3 megabits per second if the type of service is a video service, and a PIR of 1 megabits per second if the type of service is a peer-to-peer service. The PIR is a parameter related to a quality of service associated with limiting of the bandwidth.

The schematic diagram 1010 illustrates applying policies, according to the present disclosure. More specifically, according to the policy, if it is determined that the network is congested, services being provided to the subscribers need to be limited for the subscribers of all levels 1025, 1030, and 1035 of services. However, the policy may still keep differentiation between the levels 1025, 1030, and 1035 of services so that the higher level of service (e.g., the level 1025 of services) can obtain better service that the lower level of service (e.g., the level 1030 of service).

Therefore, the services provided to the subscribers may be limited based on the levels 1025, 1030, and 1035 of services. For example, for the level 1025 of services, the policy may prescribe to lower the PIR to 4 megabits per second if the type of service is the video service, and to lower the PIR to 2 megabits per second if the type of service is the peer-to-peer service. Similarly, for the level 1030 of services, the policy may prescribe to lower the PIR to 2 megabits per second if the type of service is the video service, and to lower the PIR to 0.5 megabits per second if the type of service is the peer-to-peer service. For the level 1035 of services, the policy may prescribe to lower the PIR to 1 megabits per second if the type of service is the video service, and to lower the PIR to 0.1 megabits per second if the type of service is the peer-to-peer service. Therefore, though the quality of service will be lowered for the subscribers of all levels 1025, 1030, and 1035 of services in case of congestion of the network, all subscribers can still have access to the service and no subscribers will be disconnected from the service.

The schematic diagram 1015 illustrates applying policies, according to another example embodiment of the present disclosure. More specifically, according to the policy, if it is determined that the network is congested, services being provided to the subscribers need to be limited for the subscribers of all levels 1025, 1030, and 1035 of services. The policy may define a coefficient that may be applied to the provided quality of service. For example, applying of the coefficient equal to 0.8 means limiting providing of the service to 80%. As shown on the schematic diagram 1015, different coefficients, shown as KG, KS, and KB, may be applied to different levels 1025, 1030, and 1035 of services, respectively. Furthermore, different coefficients, shown as KG1 and KG2, KS1 and KS2, and KB1 and KB2, may be applied depending on the type of the service. For example, for the level 1025 of services, the PIR of 5 megabits per second may be multiplied by the coefficient KG1 for the video service and by the coefficient KG2 for the peer-to-peer service. After applying the policy, the network conditions can be normalized and the policy may prescribe to stop applying coefficients to the levels 1025, 1030, and 1035 of services.

The schematic diagram 1020 illustrates applying policies, according to another example embodiment of the present disclosure. As shown on the schematic diagram 1020, for the level 1025 of services, coefficients KG1 and KG2 may be applied to the video service and the peer-to-peer service, respectively. The network parameters associated with the subscriber of the level 1025 of services may be monitored. A policy 1040 for modifying the level 1025 of services, for example, in case of detection of a certain event, may prescribe to reduce the coefficient KG1 to 0.3 and the coefficient KG2 to 0.4. Additionally, if a certain parameter of the network exceeds a predetermined threshold, the policy may prescribe to reduce the coefficient KG1 to 0.4 and the coefficient KG2 to 0.5.

In an example embodiment, a servicing node may select coefficients for different levels of services and different types of services based on attribute adjustment rules. The attribute adjustment rules may contain rules defining how the attributes of the network, such as the PIR, need to be modified.

In example embodiments, the modification of policies may be performed by the servicing node not only in cases when the network is congested. More specifically, the servicing node may determine that a network load is low and may modify the policies, for example, by increasing the PIR, to allow the subscribers to go beyond the bandwidth of initially applied policies. Additionally, such modification of policies may allow for utilizing network resources efficiently and not letting the system idle.

Figure 11:
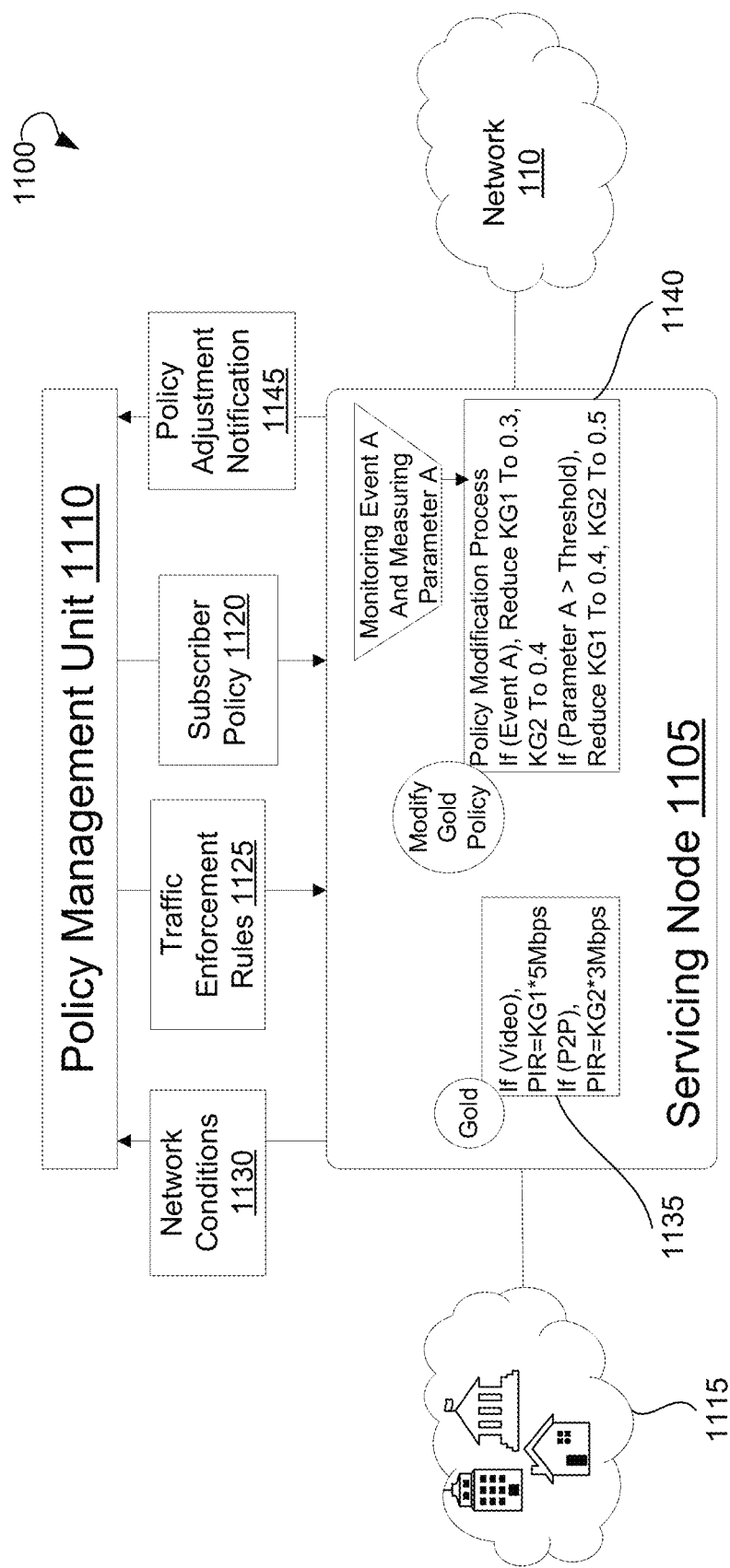
FIG. 11 is a schematic diagram showing adjustment of subscriber policies.

FIG. 11 is a schematic diagram 1100 showing adjusting of subscriber policies. A servicing node 1105 may communicate with network 110 and a subscriber 1115. A policy management unit 1110 may provide the servicing node 1105 with a subscriber policy 1120. The subscriber policy 1120 may include traffic enforcement rules 1125 defining rules for processing the data traffic upon identification of certain network conditions. The servicing node 1105 may monitor network conditions and events and measure parameters of the network 110. In some embodiments, the servicing node 1105 may send data related to the network conditions 1130 to the policy management unit 1110. The servicing node 1105 may modify the traffic enforcement rules 1125 and send a policy adjustment notification 1145 to the policy management unit 1110. The servicing node 1105 may apply different policies 1140 to different levels of services, such as level 1135 of services.

Figure 12:
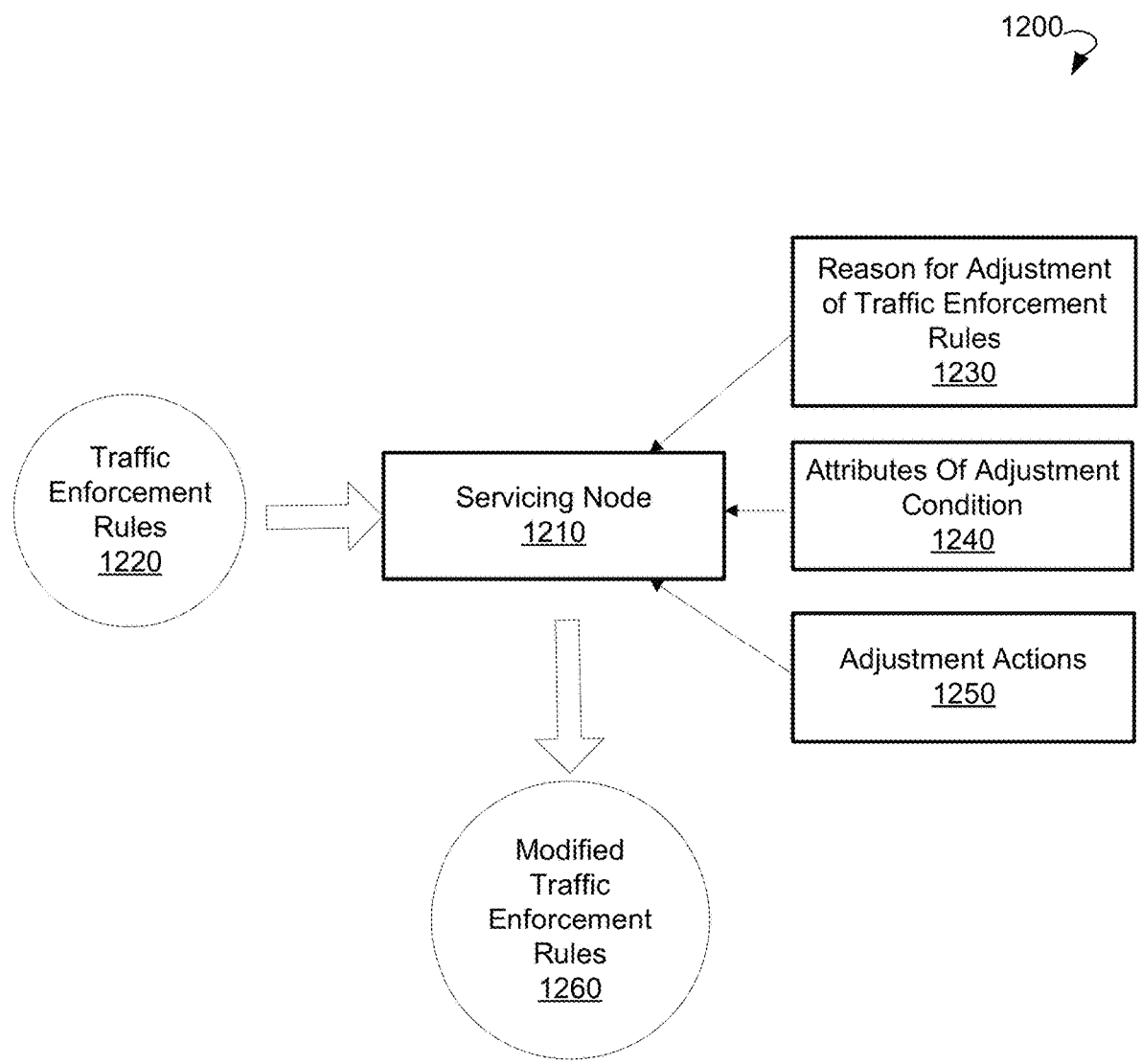
FIG. 12 is a block diagram illustrating modifications of traffic enforcement rules by a servicing node.

FIG. 12 is a block diagram 1200 illustrating modification of traffic enforcement rules by a servicing node. The servicing node 1210 may be provided with traffic enforcement rules 1220. Upon monitoring of network conditions, the servicing node 1210 may determine that there is a reason 1230 for adjustment of the traffic enforcement rules 1220. Furthermore, based on the network conditions, the servicing node 1210 may determine attributes 1240 of adjustment conditions (i.e., attributes that need modifying). Based on attribute adjustment rules shown as adjustment actions 1250 (which may be received in advance by the servicing node 1210 from a policy management unit), the servicing node 1210 may modify the attributes 1240 of adjustment conditions. The servicing node 1210 may modify the traffic enforcement rules 1220 by including data related to modified attributes into the traffic enforcement rules 1220. Therefore, modified traffic enforcement rules 1260 may be provided.

EXAMPLES OF MODIFICATION OF TRAFFIC ENFORCEMENT RULES BY A SERVICING NODE

Example 1

A traffic enforcement rule 1220 may be related to limiting bandwidth consumed by the application. Rules for this traffic enforcement rule 1220 may be as follows: "Rule 1: If <Netflix Video>, QoS-PIR=K1*2 Mbps," "Rule 2: if <Amazon Video>, QoS-PIR=K2*3 Mbps," where K is a coefficient that may be applied to the quality of service and QoS means the quality of service. The reason 1230 for adjustment of the traffic enforcement rule 1220 may be that a predefined bandwidth limit is not enough to ensure access to an application to active subscribers. The attributes 1240 of adjustment conditions may include an aggregated bandwidth consumed by the active subscribers trying to access the application. The adjustment actions 1250 may include reducing bandwidth limit proportionally to a level of service provided to the subscriber. The adjustment actions 1250 may be defined as "If <aggregated bandwidth of subscribers exceeds 30 Gbps, K1=K1*0.5, K2=K2*0.7".

Alternatively, the reason 1230 for adjustment of the traffic enforcement rule 1220 may be that a demand became lower and, therefore, more bandwidth is available for active subscribers and more application servers become available. The attributes 1240 of adjustment conditions may include a number of active subscribers trying to consume application bandwidth and a number of application servers. The adjustment actions 1250 may include increasing bandwidth limit to an originally predefined level.

Example 2

A traffic enforcement rule 1220 may be related to optimizing video traffic. Rules for this traffic enforcement rule 1220 may be as follows: "Rule 1: If <HD Video>, forward to VAS cluster optimizers including endpoint-1, endpoint-2, endpoint-3," where VAS cluster is a value adding service cluster. The reason 1230 for adjustment of the traffic enforcement rule 1220 may be that a number of subscribers entitled for video optimization has grown and the cluster of optimizers may need to be extended. The attributes 1240 of adjustment conditions may include a number of premium subscribers that require video optimization. The adjustment actions 1250 may include adding endpoint-4 and endpoint-5 to a pool of optimizers of the value adding service cluster. The adjustment actions 1250 may be defined as "Modify the optimizer pool by adding more endpoints."

Example 3

A traffic enforcement rule 1220 may be related to handling Domain Name System (DNS) traffic. Rules for this traffic enforcement rule 1220 may be as follows: "Rule 1: If <DNS protocol>, steer traffic to the pool of DNS servers." The reason 1230 for adjustment of the traffic enforcement rule 1220 may be that a volume of DNS traffic is higher than a predetermined threshold. The attributes 1240 of adjustment conditions may include DNS traffic aggregated bandwidth. The adjustment actions 1250 may include increasing the DNS server pool. The adjustment actions 1250 may be defined as "Add additional servers to the DNS cluster."

Alternatively, the reason 1230 for adjustment of the traffic enforcement rule 1220 may be that a volume of DNS traffic returned to normal. The attributes 1240 of adjustment conditions may include returning of volume of DNS to normal. The adjustment actions 1250 may include decreasing the DNS server pool. The adjustment actions 1250 may be defined as "Reduce the number of DNS servers."

Example 4

A traffic enforcement rule 1220 may be related to subscriber monitoring. Rules for this traffic enforcement rule 1220 may be as follows: "Rule 1: For <HTTP protocol>, generate flow-based report"; "Rule 2: if <other traffic>, generate periodical aggregated reporting records." The reason 1230 for adjustment of the traffic enforcement rule 1220 may be that the behavior of the subscriber becomes suspicious and the network operator needs a more granular report for browsing habits. The attributes 1240 of adjustment conditions may include behavioral analysis. The adjustment actions 1250 may include adjusting policy for the subscriber switching from a flow-based report to a transaction-based report. The adjustment actions 1250 may be defined as "Change granularity and frequency of generated reporting records."

Alternatively, the reason 1230 for adjustment of the traffic enforcement rule 1220 may be that behavior of the subscriber returned to normal, and there is no need for high scrutiny reporting. The attributes 1240 of adjustment conditions may include behavioral analysis. The adjustment actions 1250 may include returning subscriber to a flow-based reporting mode. The adjustment actions 1250 may be defined as "Change granularity and frequency of generated reporting records."

Figure 13:
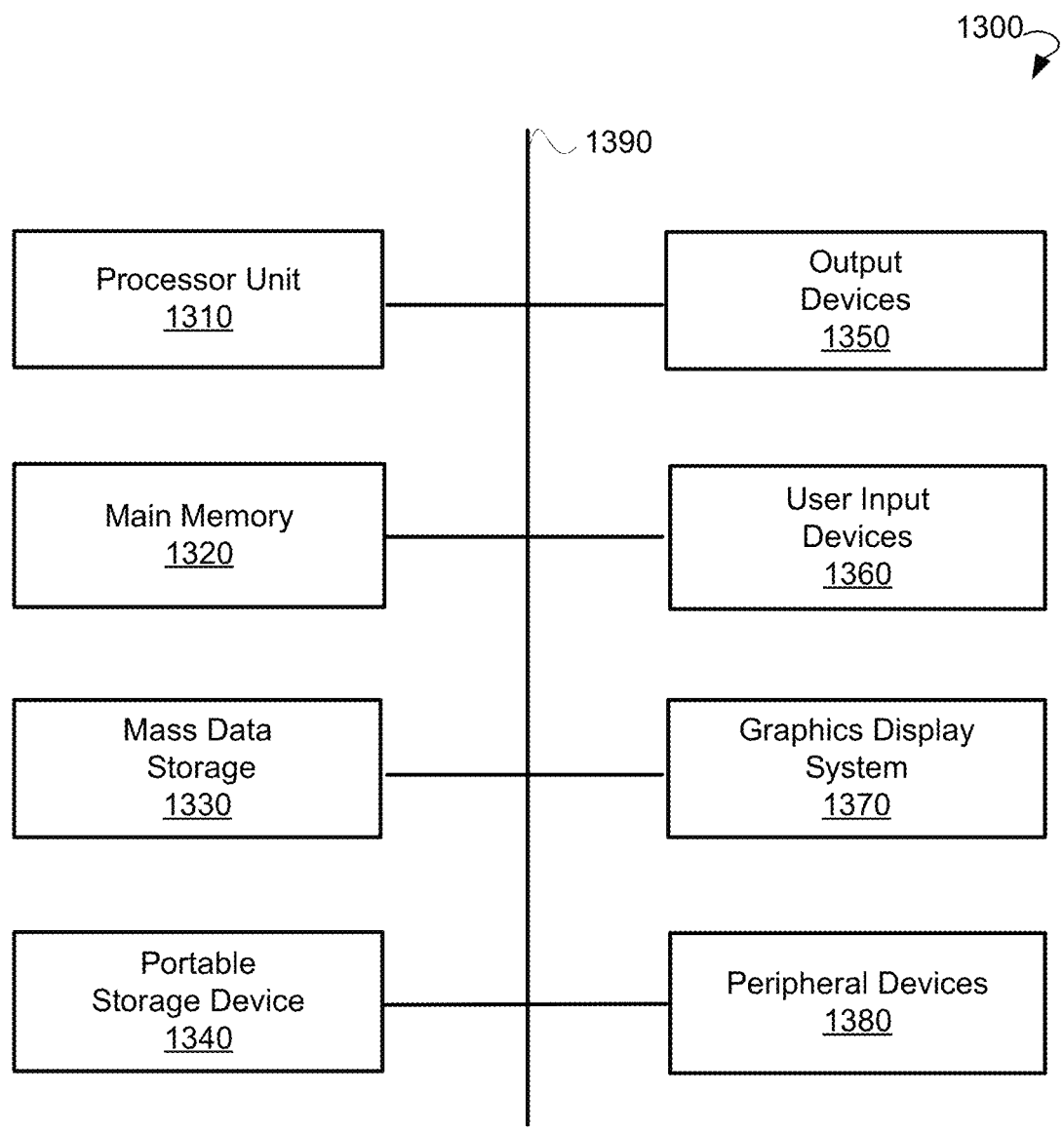
FIG. 13 shows a diagrammatic representation of a computing device for a machine, within which a set of instructions for causing the machine to perform any one or more of the methodologies discussed herein, can be executed.

FIG. 13 illustrates an example computer system 1300 that may be used to implement embodiments of the present disclosure. The system 1300 of FIG. 13 can be implemented in the contexts of the likes of computing systems, networks, servers, or combinations thereof. The computing system 1300 of FIG. 13 includes one or more processor units 1310 and main memory 1320. Main memory 1320 stores, in part, instructions and data for execution by processor 1310. Main memory 1320 stores the executable code when in operation. The computer system 1300 of FIG. 13 further includes a mass data storage 1330, portable storage device 1340, output devices 1350, user input devices 1360, a graphics display system 1370, and peripheral devices 1380. The methods may be implemented in software that is cloud-based.

The components shown in FIG. 13 are depicted as being connected via a single bus 1390. The components may be connected through one or more data transport means. Processor unit 1310 and main memory 1320 are connected via a local microprocessor bus, and the mass data storage 1330, peripheral device(s) 1380, portable storage device 1340, and graphics display system 1370 are connected via one or more input/output (I/O) buses.

Mass data storage 1330, which can be implemented with a magnetic disk drive, solid state drive, or an optical disk drive, is a non-volatile storage device for storing data and instructions for use by processor unit 1310. Mass data storage 1330 stores the system software for implementing embodiments of the present disclosure for purposes of loading that software into main memory 1320.

Portable storage device 1340 operates in conjunction with a portable non-volatile storage medium, such as a floppy disk, compact disk (CD), digital video disc (DVD), or USB storage device, to input and output data and code to and from the computer system 1300 of FIG. 13. The system software for implementing embodiments of the present disclosure is stored on such a portable medium and input to the computer system 1300 via the portable storage device 1340.

User input devices 1360 provide a portion of a user interface. User input devices 1360 include one or more microphones, an alphanumeric keypad, such as a keyboard, for inputting alphanumeric and other information, or a pointing device, such as a mouse, a trackball, stylus, or cursor direction keys. User input devices 1360 can also include a touchscreen. Additionally, the computer system 1300 as shown in FIG. 13 includes output devices 1350. Suitable output devices include speakers, printers, network interfaces, and monitors.

Graphics display system 1370 includes a liquid crystal display (LCD) or other suitable display device. Graphics display system 1370 receives textual and graphical information and processes the information for output to the display device.

Peripheral devices 1380 may include any type of computer support device to add additional functionality to the computer system.

The components provided in the computer system 1300 of FIG. 13 are those typically found in computer systems that may be suitable for use with embodiments of the present disclosure and are intended to represent a broad category of such computer components that are well known in the art. Thus, the computer system 1300 of FIG. 13 can be a personal computer (PC), hand held computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory (CD-ROM) disk, DVD, BLU-RAY DISC (BD), any other optical storage medium, Random-Access Memory (RAM), Programmable Read-Only Memory (PROM), Erasable Programmable Read-Only Memory (EPROM), Electronically Erasable Programmable Read Only Memory (EEPROM), flash memory, and/or any other memory chip, module, or cartridge.

In some embodiments, the computer system 1300 may be implemented as a cloud-based computing environment, such as a virtual machine operating within a computing cloud. In other embodiments, the computer system 1300 may itself include a cloud-based computing environment, where the functionalities of the computer system 1300 are executed in a distributed fashion. Thus, the computer system 1300, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 1300, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for automated adjusting of subscriber policies are disclosed. While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A system for automated adjusting of subscriber policies, the system comprising:
a servicing node comprising a hardware processor and a memory, the hardware processor being configured to:
apply traffic enforcement rules to a data traffic associated with a subscriber;
determine network conditions associated with the data traffic;
based on one or more modified attributes, determine that at least one adjustment action needs to be applied to a processing of the data traffic, the at least one adjustment action including changing a frequency of collecting records related to a network activity of the subscriber;
apply the at least one adjustment action to the processing of the data traffic; and
modify the traffic enforcement rules based on the one or more modified attributes by replacing one or more attributes of a plurality of attributes with the one or more modified attributes to obtain modified traffic enforcement rules; and
a policy management unit configured to:
send the one or more modified attributes to the servicing node; and
based on the determination of the network conditions, modify the one or more attributes of the plurality of attributes according to attribute adjustment rules to obtain the one or more modified attributes.

2. The system of claim 1, wherein the policy management unit is further operable to send a subscriber policy to the servicing node, the subscriber policy including the one or more attributes and the attribute adjustment rules.

3. The system of claim 1, wherein the policy management unit is further operable to send the modified attributes to the servicing node.

4. The system of claim 1, wherein the servicing node is further operable to send data associated with the network conditions to the policy management unit.

5. The system of claim 1, wherein the servicing node is further operable to monitor the network conditions within the network.

6. The system of claim 1, wherein the policy management unit is further operable to:
analyze the network conditions;
based on the analysis, determine an occurrence of a critical event; and
in response to the determination, modify the one or more attributes.

7. The system of claim 6, wherein the critical event includes one or more of the following: an absence of one of predetermined network conditions, presence of an additional network condition absent from the predetermined network conditions, and exceeding a predetermined threshold by the one of the predetermined network conditions.

8. The system of claim 1, wherein the network conditions include one or more of the following: events associated with the network, a network workload, a resource availability, a resource utilization, a subscriber behavior, a user experience, a time, a planned reconfiguration, and an unplanned reconfiguration.

9. A system for automated adjustment of subscriber policies, the system comprising:
a servicing node comprising a hardware processor and a memory, the hardware processor being configured to:
apply traffic enforcement rules to a data traffic associated with a subscriber;
determine network conditions associated with the data traffic;
based on the determination, modify one or more attributes of a plurality of attributes according to attribute adjustment rules to obtain one or more modified attributes;
based on the one or more modified attributes, determine that at least one adjustment action needs to be applied to a processing of the data traffic, the at least one adjustment action including changing a frequency of collecting records related to a network activity of the subscriber;
applying the at least one adjustment action to the processing of the data traffic; and
modify the traffic enforcement rules based on the one or more modified attributes by replacing the one or more attributes of the plurality of attributes with the one or more modified attributes to obtain modified traffic enforcement rules.

10. The system of claim 9, further comprising a policy management unit operable to send a subscriber policy to the servicing node, the subscriber policy including the one or more attributes, the attribute adjustment rules, and the traffic enforcement rules.

11. The system of claim 10, wherein the servicing node is further operable to send a policy adjustment notification to the policy management unit, the policy adjustment notification being associated with the modified traffic enforcement rules.

12. The system of claim 9, wherein the servicing node is further operable to:
analyze the network conditions;
based on the analysis, determine an occurrence of a critical event; and
in response to the occurrence, modify the one or more attributes.

13. The system of claim 12, wherein the critical event includes one or more of the following: an absence of one of predetermined network conditions, presence of an additional network condition absent from the predetermined network conditions, and exceeding a predetermined threshold by the one of the predetermined network conditions.

14. A method for automated adjustment of subscriber policies, the method comprising:
applying, by a servicing node, traffic enforcement rules to a data traffic associated with a subscriber;
determining, by the servicing node, network conditions associated with the data traffic;
based on the determination, modifying, by a policy management unit, one or more attributes of a plurality of attributes according to attribute adjustment rules to obtain one or more modified attributes;
sending, by the policy management unit, the one or more modified attributes to the servicing node;
based on the one or more modified attributes, determining, by the servicing node, that at least one adjustment action needs to be applied to a processing of the data traffic, the at least one adjustment action including changing a frequency of collecting records related to a network activity of the subscriber;
applying, by the servicing node, the at least one adjustment action to the processing of the data traffic; and
modifying, by the servicing node, the traffic enforcement rules based on the one or more modified attributes by replacing the one or more attributes of the plurality of attributes with the one or more modified attributes to obtain modified traffic enforcement rules.

15. The method of claim 14, further comprising receiving a subscriber policy, the subscriber policy including one or more of the following: attributes, the attribute adjustment rules, and the traffic enforcement rules.

16. The method of claim 14, wherein the network conditions include one or more of the following: events associated with the network, a network workload, a resource availability, a resource utilization, a subscriber behavior, a user experience, a time, a planned reconfiguration, and an unplanned reconfiguration.

17. The method of claim 14, further comprising monitoring the network conditions within the network.

18. The method of claim 14, further comprising:
analyzing the network conditions;
based on the analyzing, determining an occurrence of a critical event; and
in response to the occurrence, modifying the one or more attributes.

19. The method of claim 18, wherein the critical event includes one or more of the following: an absence of one of predetermined network conditions, presence of an additional network condition absent from the predetermined network conditions, and exceeding a predetermined threshold by the one of the predetermined network conditions.

20. The method of claim 14, further comprising applying the modified traffic enforcement rules to a further data traffic associated with the subscriber.

* * * * *